United States Patent

Thompson et al.

[11] Patent Number: 5,226,331
[45] Date of Patent: Jul. 13, 1993

[54] APPARATUS AND METHOD FOR MEASURING THE PARTICLE NUMBER RATE AND THE VELOCITY DISTRIBUTION OF A SPRAYED STREAM

[75] Inventors: Robert A. Thompson, Quaker Street; Randy S. Brown, Schenectady, both of N.Y.

[73] Assignee: General Electric Company, Schenectady, N.Y.

[21] Appl. No.: 770,379

[22] Filed: Oct. 3, 1991

[51] Int. Cl.$^5$ .................. G01M 19/00; G01F 25/00; B05B 3/02; B05B 12/00
[52] U.S. Cl. .................. 73/865.9; 239/224; 73/3
[58] Field of Search .................. 73/865.9, 861, 3, 1 R, 73/168; 239/224, 463

[56] References Cited

U.S. PATENT DOCUMENTS

| | | | |
|---|---|---|---|
| 1,022,956 | 4/1912 | Lengerke et al. | 239/224 X |
| 2,483,637 | 10/1949 | Hawthorne et al. | 73/865.9 X |
| 2,877,865 | 3/1959 | Schlumbohm | 239/224 X |
| 3,459,049 | 8/1959 | Kamps | 73/865.9 |
| 3,856,280 | 12/1974 | Boler et al. | 239/224 X |
| 3,885,415 | 5/1975 | Burns et al. | 73/3 X |
| 3,885,496 | 5/1975 | Breitweg et al. | 239/224 X |
| 4,049,197 | 9/1977 | Brouwer | 239/224 X |
| 4,552,784 | 11/1985 | Chu et al. | 72/53 X |

FOREIGN PATENT DOCUMENTS

| | | | |
|---|---|---|---|
| 112296 | 6/1984 | European Pat. Off. | 239/224 |
| 1185150 | 10/1985 | U.S.S.R. | 73/865.9 |
| 1210905 | 2/1986 | U.S.S.R. | 73/865.9 |
| 1233952 | 5/1986 | U.S.S.R. | 73/865.9 |
| 1235549 | 6/1986 | U.S.S.R. | 73/865.9 |
| 1261720 | 10/1986 | U.S.S.R. | 73/865.9 |

Primary Examiner—Tom Noland
Attorney, Agent, or Firm—James R. McDaniel; Paul R. Webb, II

[57] ABSTRACT

This invention relates to an apparatus and method for measuring the particle number rate and the particle velocity distribution of a sprayed stream such as, a shot peening system. In particular, a double spinning disk apparatus modified with a stationary aperture and a scanning aperture is used to scan the spayed stream and observe the stream's local properties.

7 Claims, 5 Drawing Sheets

APPARATUS AND METHOD FOR MEASURING THE PARTICLE NUMBER RATE AND THE VELOCITY DISTRIBUTION OF A SPRAYED STREAM

BACKGROUND OF THE INVENTION

1. Field of the Invention

This invention relates to an apparatus and method for measuring the particle number rate and the particle velocity distribution of a sprayed stream such as, a shot peening system. In particular, a double spinning disk apparatus modified with a stationary aperture and a scanning aperture is used to scan the spayed stream and observe the stream's local properties.

2. Description of the Related Art

When applying any spray deposition process, uniformity of the deposited layer is of key importance. Since spray streams have a pattern geometry, generally round, and do not generally have uniform properties over the pattern area, it is necessary to overlap adjacent spray passes in a manner that gives uniform thickness to the finished sprayed layer.

This applies even in the simplest case of a circular spray stream having uniform properties. For example, consider depositing a uniformly thick layer with a circular spray stream that has uniform properties over its entire cross-section. In this case the deposition for a pass is proportional to the time the pattern resides over a point. Thus, the thickness at a point will vary as the cordal length of the spray circle. Therefore, the layer for a individual pass will be thickest at the center of the pattern and drop off to zero at its edges. If a surface is sprayed by such a stream and the pattern for adjacent passes just touch, the final layer depth will be as shown in FIG. 1, where R is the radius of the spray pattern plotted against distance (d) on the pattern. On the other hand, if the layer is made up of two equally spaced, overlapped passes, the result will be that shown in FIG. 2 where radius (R) is plotted against distance (d) on the pattern. For the pattern of FIG. 1 there are areas where the deposition depth is zero. For obvious reasons, this does not happen for FIG. 2. In FIG. 2, the ratio of the thickest to thinnest deposition is 1.73.

If the overlap is increased from 2 to 3, this ratio decreases to 1.19 and a relatively uniform deposition depth starts to appear. As the number of overlaps increases, the uniformity of the deposited layer gets better and better.

Consider next what happens when there is a distribution of properties over the spray stream. In the simplest case of a circular stream, the properties are axisymmetric and vary only with the radius from the center of the stream.

In this case, the argument made for the exposure time (based on cordal length) applies, but now the spray stream density as a function of cordal position must be included and the total deposition for each cord integrated. In this way, the same logic used for the simplest, uniform case can be applied and the conditions for the desired surface deposition depth established.

The arguments made above apply to depositions such as paint spray and plasma deposition. In the case of shot peening, the problem, although treated in a similar way, is more complex because two spray stream distributions act simultaneously.

In shot peening operations, not only is the number rate density important since, like paint spray, it effects coverage rate. The particle velocity distribution is also important because it effects the intensity of the compressive layer as a function of stream location. Of course, this effect can be dealt with using logic like that already described for deposition depth. However, before accounting for either effect (coverage or intensity) it is vital that a means be available to measure the distribution of properties in the spray stream.

It is apparent from the above that there exists a need in the art for a single instrument which is capable of measuring the velocity distribution and the particle rate density in a sprayed shot stream. It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for measuring stream particle density and velocity distribution, comprising first and second disks rotatably attached to a drive means and located a predetermined distance away from each other, a stream flow control means located adjacent to said first disk and a scanning means located adjacent said second disk.

In certain preferred embodiments, the stream flow control means further includes an aperture and a shutter vane rotatably attached to a timer controlled rotary solenoid such that the shutter vane is located substantially adjacent the aperture. Also, the scanning means is comprised of a movable scanning aperture and an X-Y stage.

In another further preferred embodiment, the particle number rate and the particle velocity distribution of a sprayed stream can be accurately measured.

The preferred apparatus and method, according to this invention, offer the following advantages: light weight; easy assembly and repair; excellent particle velocity distribution measurement characteristics; excellent particle number rate measurement characteristics; good stability; good durability; good economy; and high strength for safety. In fact, in many of the preferred embodiments, these factors of particle velocity distribution measurement characteristics and particle number rate measurement characteristics are optimized to an extent considerably higher than heretofore achieved in prior, known particle property measurement apparatus and methods.

BRIEF DESCRIPTION OF THE INVENTION

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
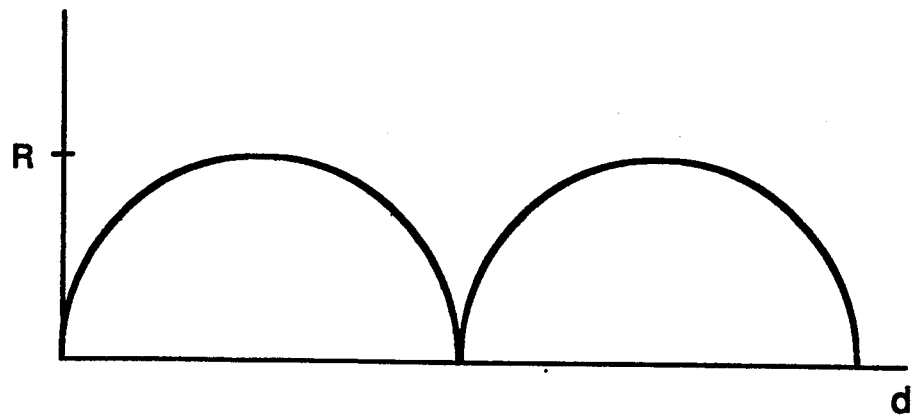
FIG. 1 is a graphical representation of a deposition layer for a conventional uniform, single pass spray.
Figure 2:
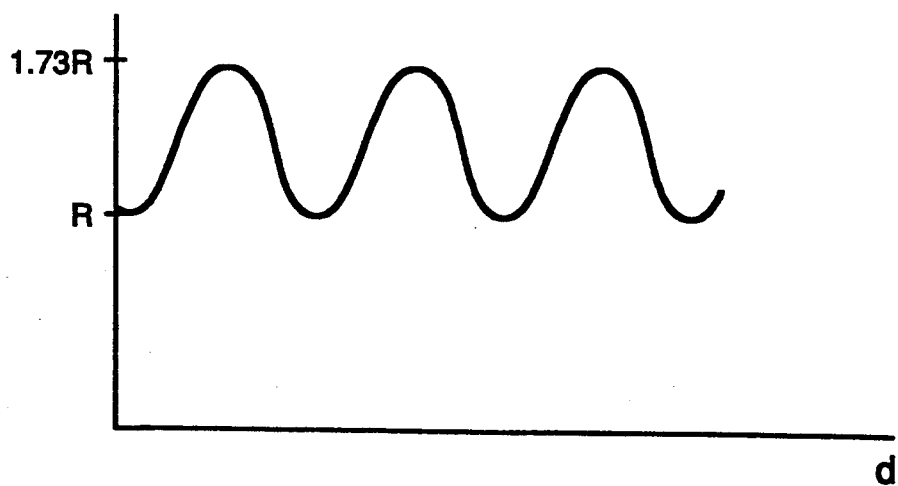
FIG. 2 is a graphical representation of a deposition layer for a conventional uniform, double pass spray.

As discussed earlier, FIG. 1 is a graphical representation of a deposition layer for a uniform, single pass spray with the radius (R) of the spray pattern plotted against distance (d) along the target. Also, FIG. 2 is a graphical representation of a deposition layer for a uniform, double pass spray with the radius (R) of the spray pattern plotted against the distance (d) along the target.

In conventional spinning disk measurements, the disks are run for sufficient time to create a clear impact pattern on the rear disk. For shot peening this pattern is elongated in the tangential direction. This is because the shot stream has a distribution of particle velocities, as well as, an inherent dispersion angle.

The width of the pattern in the radial direction indicates the dispersion angle while the elongation of the pattern in the tangential direction is due to the variation in particle velocities or the time it takes the particles to pass from the front disk shutter hole to the recording rear disk.

In a typical measurement, the effects are averaged by finding the centers of the impact patterns with the disks running first in the clockwise direction and then in the counterclockwise direction. The calculation of average velocity is as follows.

The time of flight for a particle passing between the front and rear disks is $$t = L/V \quad (1).$$

where:
t = time of flight (sec.).
L = the distance between disks (in.).
V = the average particle velocity (in./sec.).

Since the disks are rotating, the angle they subtend during the particle's flight is $$\theta/2 = 360Nt \quad (2)$$

where:
N = disk rotational speed (revolutions/sec.).
θ = angle between particle indentation and a normal projection from the center of the shutter hole in the front disk to the back disk (degrees).

Equations (1) and (2) can be combined and solved for V to give the average shot velocity as $$V = 720NL/\theta \quad (3).$$

The basic principle of the present invention is the same as that just described, but here, instead of averages for the entire stream, individual elements of the stream's cross-section are examined and individual particle velocities within those elements are determined.

Figure 3:
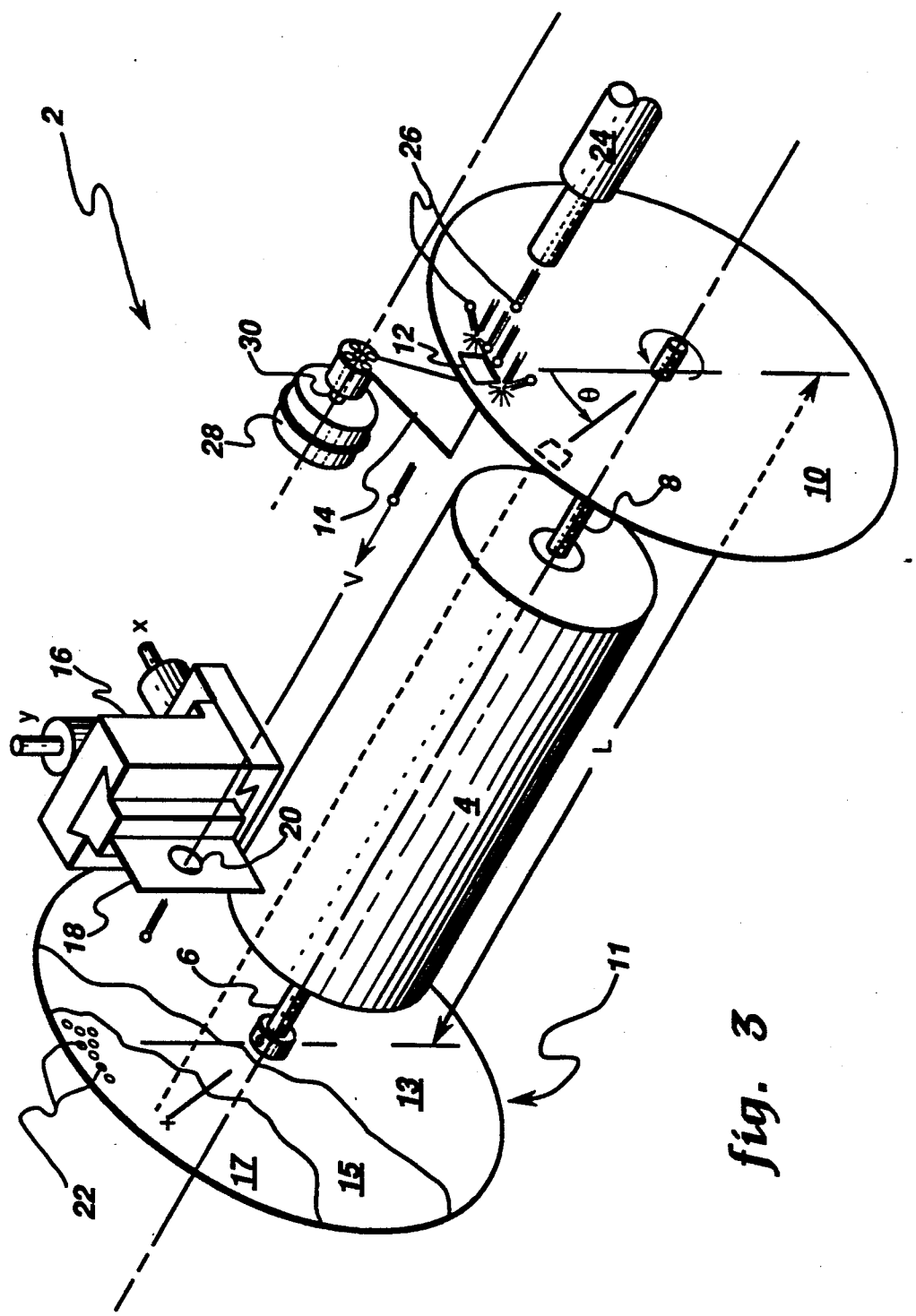
FIG. 3 is a schematic illustration of an apparatus for measuring stream particle density and velocity distribution, according to the present invention.

With this background in mind, FIG. 3 illustrates apparatus 2 for measuring stream particle number rate and velocity distributions. In particular, apparatus 2 includes, in part, a conventional open loop stepper motor 4 and disks 10,11, hole 12, shutter vane 14 and X-Y stage 16. Disk 10, preferably, is constructed of aluminum. Disks 10,11 are rigidly attached to shafts 6,8, respectively, by conventional fasteners. It is to be understood that for apparatus 2 to operate properly, the speed of shafts 6,8 must be accurately measured and controlled by a conventional speed regulation device (not shown). Located on disk 10 is shutter hole 12. Hole 12 is machined in disk 10 by conventional metal removal techniques. The width of hole 12, preferably, is about 1/36 of the circumference of disk 10 so that disk 11 receives shot 26 approximately 1/36 of the time. Adjacent to one side of shutter hole 12 is shutter vane 14. Vane 14 is rigidly attached to shaft 30. Shaft 30 is rotatably attached to a conventional timer controlled rotary solenoid 28. As discussed in more detail later, hole 12, vane 14, and disk 11 are used to measure both particle number rate and particle velocity distribution. Located on the other side of shutter hole 12 is a conventional particle spray gun 24, for example, a shot peening gun which ejects shot peen 26. Gun 24, preferably, is located ¼ to ¾ of an inch from hole 12.

Disk 11, preferably, is constructed of an aluminum base 13, an inner layer 15 constructed of any suitable elastomeric material, such as, rubber and a top layer 17 constructed of aluminum foil. In particular, layer 15 is bonded to base 13, preferably, by a conventional adhesive. Top layer 17 is retained on layer 15 by a conventional adhesive.

Adjacent to disk 11 is a conventional X-Y stage 16. Stage 16 includes scanning plate 18 and scanning hole 20. Plate 18, preferably, is mounted to stage 16 approximately 1 inch in front of disk 11. Preferably, the axis of hole 20 is colinear with the axis of the shot stream. By adjusting the x and y axes hole 20 can be positioned at any point in the pulsating shot stream passing the front disk. Since the scanning aperture 20 is mounted in the same frame of reference as the shot peening gun 24, it can scan the shot stream just as if the spinning disks were not present. As discussed in more detail later, stage 16 is used to measure only the particle number rate and is removed when measuring particle velocity distribution.

In operation of apparatus 2, the use of the device to measure average shot velocity involves removing scanning apparatus 16, bringing the disks 10,11 up to a predetermined speed and, with gun 24 operating at steady conditions, opening shutter vane 14 for a short time, sufficient to produce a shot pattern 22 on the recording aluminum foil 17 on disk 11. For improved accuracy, motor 4 can be reversed and the process repeated to produce a second, displaced patter (not shown) on the foil. The average velocity is based on the operator's interpretation of the center of the impact pattern and the application of equation 3.

The principle of operation in the shot stream particle number rate analysis mode is identical with average velocity measurement with the exception that movable scanning aperture 20 is located just ahead of rear disk 11. Aperture 20 permits only that part of the shot stream 26 where it is located to reach the rear disk. The resulting pattern recorded on the rear disk in this case is an arc of particle impacts 22. The location of an impact on the arc defines the particle velocity according to equation (1) while the number of particles in the arc divided by 1/36 of the accurately measured and controlled time of the test is used to calculate the particle flux at that point in the shot stream. Also, the shot stream particle number rate can be determined by the following equation:

$$\text{stream particle number rate} = PA/t \tag{4}$$

where, P=number of recorded impacts for each measurement, t=exposure time (sec.) and A=aperture area (in.²).

The following examples were prepared in accordance with the above-identified apparatus 2.

EXAMPLE 1

The conditions for a pressure pot peening gun test were as follows:
Shot mass flow—8 lbs/min
Air Pressure—40 psi
Disk Speed (N)—16 rev/sec
Shutter Time—0.083"×0.083"
Shot Size—0.014" diameter
Gun manufactured by Progressive Technologies, Grand Rapids, Mich.

The disk speed was controlled by a conventional indexer (not shown) connected to motor 4. Since this speed appears in equation (1) it is critical that it be accurate. It is also critical that the expected speed be consistent and that the motor is reliable under all test conditions. It is to be understood that controlled speed motors, as well as stepper motors, could be used.

Figure 4:
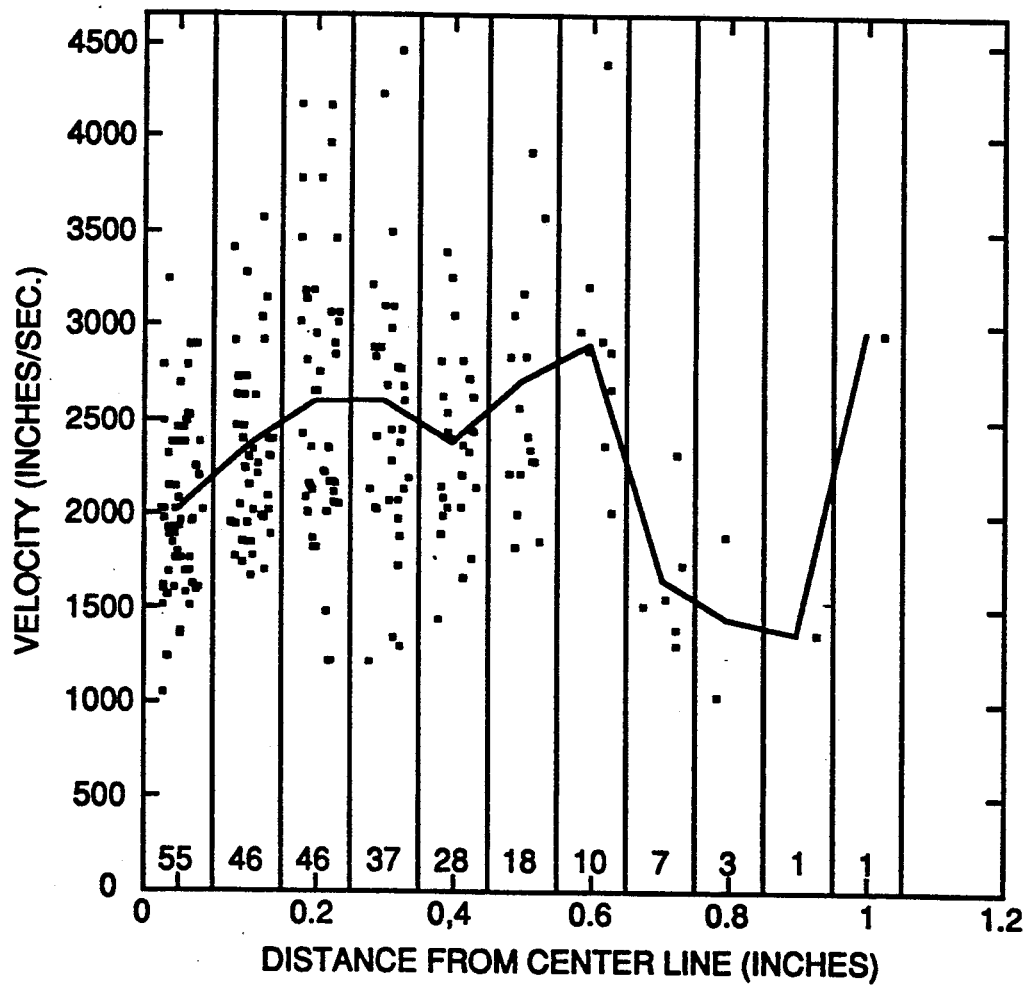
FIG. 4 is a graphical representation of the particle velocity distribution to the left of the center of the target for a pressure pot type shot peening gun.

Shutter vane 14 just behind the front rotating disk intercepts shot flowing to the rear disk. It is operated by rotary solenoid 28. Solenoid 28 is, in turn, controlled by a timing circuit (not shown) to insure equal exposure time for all tests. After running several tests and scanning the shot stream, it was determined that the average velocity of the particles in the steam could be considered a constant. The average velocity had a range from about 2000 to 2200 in/sec as shown in the graph of FIG. 4. There did appear to be some variation in the velocity, but it was very small compared to the average velocity. The variation in velocity is most likely due to the path a particle takes through the nozzle. In particular, particles that bounce off the nozzle walls will be retarded relative to those that go straight out. Because there are an infinite number of paths out of the nozzle, the particles' position at some distance from the nozzle is truly random regardless of whether it bounced or passed cleanly through the nozzle.

EXAMPLE 2

Same operating conditions are employed in Example 1.

In example 2, a suction-type peening gun manufactured by Cyclo-blast Dry Hover Company, Henworth, N. J. is used.

Figure 5:
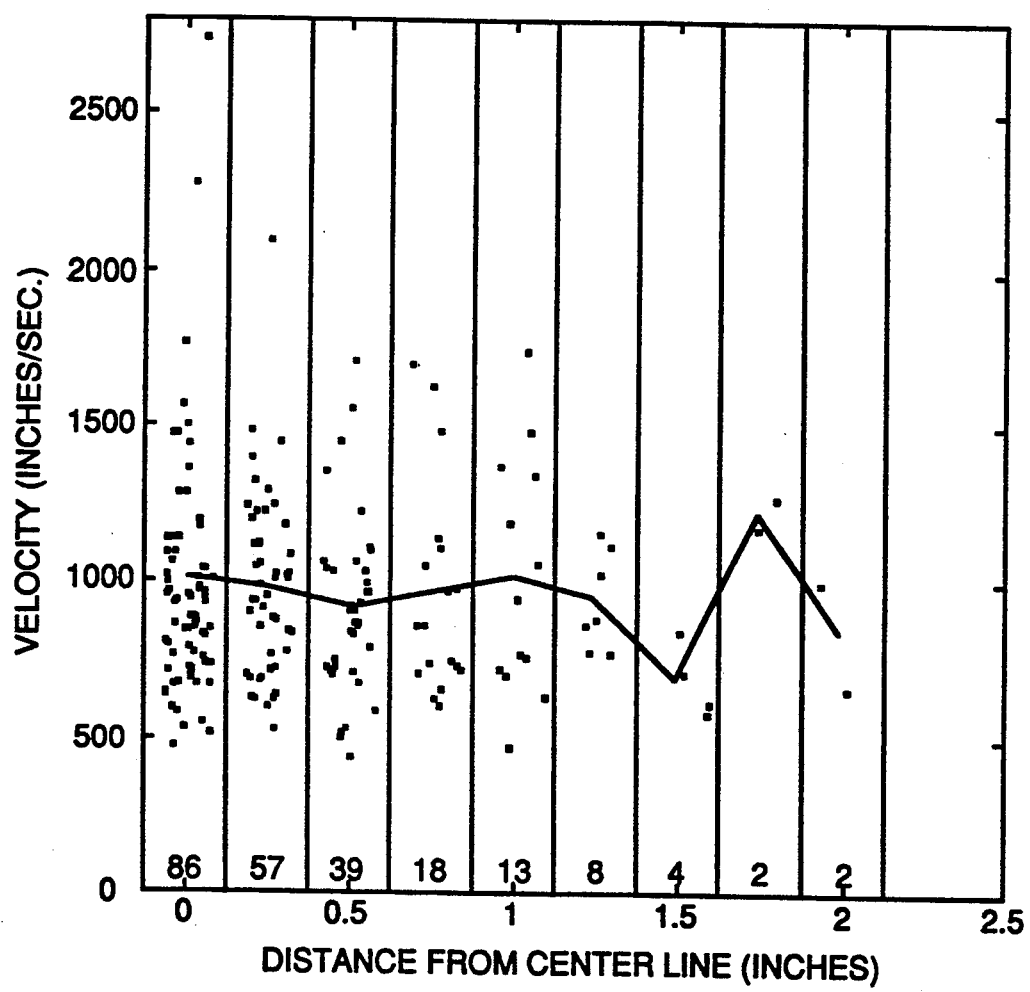
FIG. 5 is a graphical representation of the particle velocity distribution to the left of the center of the target for a suction type shot peening gun.

When using the suction-type peening gun, the average velocities were constant at about 1000 in./sec as shown in the graph of FIG. 5. This was about half the velocities recorded when using the pressure pot peening gun. The data was taken under similar conditions, so it is obvious that the two gun types performed differently. The difference can be attributed to the particles in a pressure pot machine already having a relatively high velocity before they reach the nozzle for final acceleration.

EXAMPLE 3

The spinning disk test results were also used to determine the particle number rate by counting particles at each scanned point in the stream. That is, as the masking aperture 12 is moved across the shot stream, a certain number of particles pass through at each location. Since the run time is accurately controlled at each test location, by counting particles and plotting the number versus the location in the shot stream, a graphical representation can be obtained for the distribution.

Figure 6:
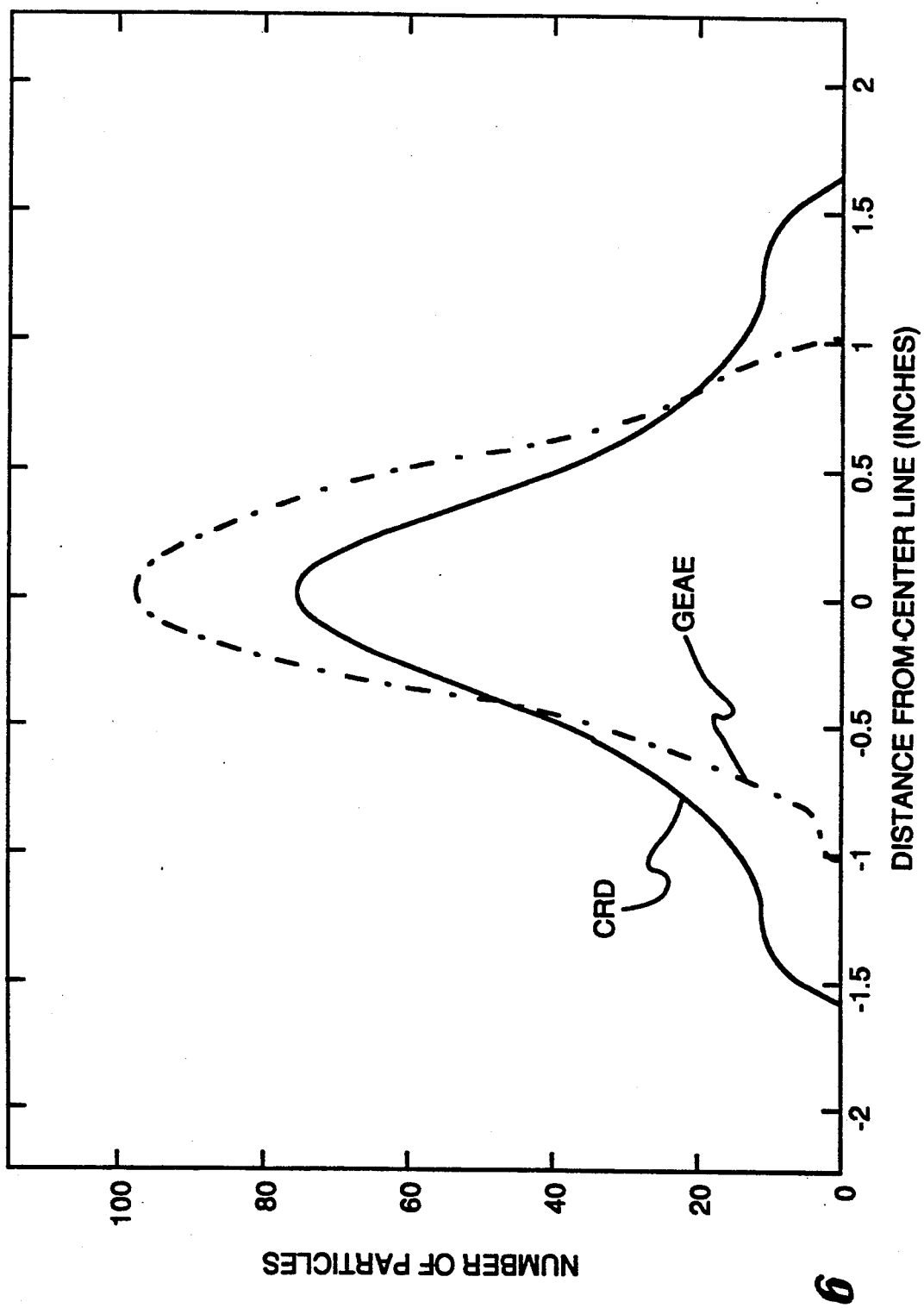
FIG. 6 is a graphical representation of density rate data for a pressure pot type peening gun and a suction type peening gun.

By using a conventional software package, such as, Pro-Matlab, both the graph and an 8th order polynomial approximation are obtained as shown in the graph of FIG. 6. The polynomial is determined by a conventional software package, such as, Matlab using a least squares method. By looking at the results, the polynomial is a good approximation of the shot stream distribution.

Next, consider the comparison of the pressure pot peening gun and the suction-type peening gun particle number rates. The aperture sizes, integration (the amount it was moved for each consecutive test), and exposure times are different for the tests run for the two types of peening guns. To render them compatible on an equal scale, the polynomial coefficients are normalized and an equal scale is determined for both sets of coefficients. The profile of the distribution of the pressure pot peening gun data solid line as shown in FIG. 6 discloses a tight stream with a very crisp peak. The stream width appears to be approximately 2 to 2.25 inches. The stream of the suction-type peening gun as shown as a dotted line in FIG. 6 is about double this at approximately 4 inches. The higher nozzle velocity for the pressure pot gun left less time for lateral motion to spread the stream compared to the suction type gun. Also, the density rate at the center of the pressure pot stream is approximately 1.25 times that of the suction gun stream.

While the preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. An apparatus for measuring stream particle density and velocity distribution from a spray gun comprised of:
    a first drive;
    first and second disks rotatably attached to said first drive and located a predetermined distance away from each other;
    a stream flow controller located adjacent to said first disk wherein said stream flow controller is further comprised of:
    a shutter located adjacent said first disk; and
    an aperture located substantially on said first disk; and
    a scanner located adjacent said second disk, said shutter when not open blocking any portion of a stream of particles from the spray gun which passes through said aperture from contacting said scanner.

2. The apparatus, according to claim 1, wherein said second disk is further comprised of:
    a base layer;
    an intermediate resilient layer; and
    a top recording layer for recording a spray pattern produced by said stream of particles from the spray gun.

3. The apparatus according to claim 1, wherein said aperture is approximately 1/36 of a circumference of said first disk.

4. The apparatus, according to claim 1, wherein said scanner is further comprised of:
   and X-Y stage;
   a plate movably attached to said X-Y stage; and
   a hole located in said plate.

5. The apparatus, according to claim 1, wherein said shutter is further comprised of:
   a second drive;
   a shaft rotatably connected at a first end to said second drive; and
   a shutter vane rigidly attached to a second end of said shaft.

6. The apparatus, according to claim 5, wherein said second drive is further comprised of:
   a timer controlled rotary solenoid.

7. The apparatus, according to claim 1, wherein said spray gun is further comprised of:
   a shot peening gun.

* * * * *